United States Patent [19]

Kuno et al.

[11] Patent Number: 4,505,049
[45] Date of Patent: Mar. 19, 1985

[54] METHOD OF MEASURING ORIGIN OF MOVING SECTION IN ROBOT AND APPARATUS THEREFOR

[75] Inventors: Toshitaka Kuno, Nagoya; Toshiaki Ikeda, Toyota, both of Japan

[73] Assignee: Kabushiki Kaisha Toyota Chuo Kenkyusho, Aichi, Japan

[21] Appl. No.: 461,232

[22] Filed: Jan. 26, 1983

[30] Foreign Application Priority Data

Feb. 2, 1982 [JP] Japan .................................. 57-15202

[51] Int. Cl.³ .............................................. G01C 9/06
[52] U.S. Cl. .................................. 33/333; 33/181 R; 33/1 PT
[58] Field of Search ................ 33/1 PT, 1 MP, 1 CC, 33/174 L, 347, 343, 333, 365, 370-373, 381-383, 180 R, 181 R, 377, 379; 414/589, 590, 591, 730

[56] References Cited

U.S. PATENT DOCUMENTS

| | | | |
|---|---|---|---|
| 3,146,529 | 9/1964 | Chamberlin | 33/382 X |
| 4,044,473 | 8/1977 | Crask | 33/333 |
| 4,125,944 | 11/1978 | Esposito | 33/347 |
| 4,356,638 | 11/1982 | McKenna | 33/333 |

*Primary Examiner*—Harry N. Haroian
*Attorney, Agent, or Firm*—Parkhurst & Oliff

[57] ABSTRACT

The position of the moving section in a robot is accurately and easily adjusted to a position of the origin by: setting a moving section being rotatably secured to a reference section through a rotary shaft in a manner that the axis of the rotary shaft is disposed horizontally; mounting an angular sensor for detecting an inclination angle of the moving section with respect to the origin, such as a level, on the moving section at a predetermined position thereof with respect to the axis of the rotary shaft; and rotating the moving section about the rotary shaft in response to a detected inclination angle. The apparatus therefor includes the angular sensor, such as a level, disposed on a mounting member and held in a position by a positioning member, and a rotating member for rotating the moving section about the rotary shaft in response to a detected inclination angle.

15 Claims, 6 Drawing Figures

METHOD OF MEASURING ORIGIN OF MOVING SECTION IN ROBOT AND APPARATUS THEREFOR

BACKGROUND OF THE INVENTION

1. Field of the Invention

The present invention relates to a method of measuring an origin of a moving section in a robot, wherein the origin of the moving section with respect to a reference section is measured in an industrial robot, the moving section of which is rotatably secured to the reference section, and an apparatus therefor.

2. Description of the Prior Art

Of the industrial robots, in an articulated robot of a coordinate transformation processing type, in which positioning data are given by a cartesian coordinate system, reference positions of the moving sections of the the cartesian coordinate system, i.e. origins, for example, vertical positions.

In consequence, during the manufacturing and assembling, specific moved positions of the moving sections with respect to the reference sections are definitely determined as origins by use of a special jig and the like, and thereupon, the moving sections move, receiving positional data referenced from these origins.

However, when it becomes necessary to replace a component of the robot such as a motor with new one after the robot has been operated, the moving section must be removed for repairing, and moreover, the origin of the moving section must be measured in reassembling the moving section after repairing. To overcome this problem, heretofore, there has been practiced that coincidence marks are provided on the moving section and the reference section previously in the stage of manufacture, and, during reassembling, these coincidence marks are visually brought into register to measure the origin of the moving section. However, it is impossible to accurately measure the origin, and the special jig and the like, which have been used in the stage of manufacture, are required again.

SUMMARY OF THE INVENTION

The present invention has been developed to obviate the above-described disadvantages of the prior art and has as its object the provision of a method of measuring the origin of a moving section in a robot, wherein the positions of the respective moving sections can be accurately and readily adjusted to the positions of origins and an apparatus therefor.

According to the method of the present invention: a moving section in a robot which is rotatably secured to a reference section through a rotary shaft is set in a manner that the axis of the rotary shaft is disposed horizontally; an angular sensor for detecting an inclination angle of the moving section with respect to the origin is mounted on the moving section at a predetermined position thereof with respect to the axis of the rotary shaft; and the moving section is rotated or swiveled (hereinafter referred to simply as rotated) about the rotary shaft in response to a detected inclination angle, thereby adjusting the position of the moving section to a position of the origin. The angular sensor may be a level having a plane of vision incorporated in a plane perpendicular to the rotary shaft.

The apparatus according to the present invention comprises: mounting means provided on the moving section in a robot; an angular sensor for detecting an inclination angle of the moving section with respect to the origin, such as the above-mentioned level, mounted on the mounting means in a manner that the angular sensor is disposed at a predetermined position on the moving section with respect to the axis of the rotary shaft; and rotating means for rotating the moving section about the rotary shaft in response to a detected inclination angle. The apparatus may further comprise positioning means for accurately positioning the angular sensor such as a level at a predetermined position.

DESCRIPTION OF THE PREFERRED EMBODIMENTS

Figure 1:
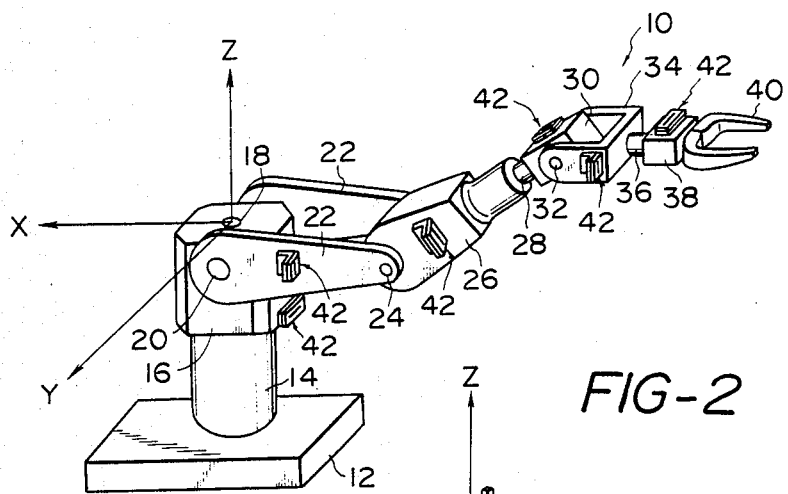
FIG. 1 is a perspective view showing a robot, to which the method of measuring the origin of the moving section in a robot and the apparatus therefor are applied.

FIG. 1 shows an embodiment, in which the present invention is applied to an articulated robot 10 having six degrees of freedom of motion.

Supported by a post 14 affixed to a base 12 of this robot 10 through a vertical rotary shaft 18 is a rotary frame 16, which is rotatable about this vertical rotary shaft 18.

Supported through a horizontal rotary shaft 20 perpendicular to the vertical rotary shaft 18 by the rotary frame 16 is a proximal end of an inner arm 22, which can swivel about this horizontal rotary shaft 20. Supported through a horizontal rotary shaft 24 being in parallel to the horizontal rotary shaft 20 by a distal end of the inner arm 22 is a proximal end of an outer arm 26, which can swivel about the horizontal rotary shaft 24.

Supported through a rotary shaft 28 perpendicular to the horizontal rotary shaft 24 by a distal end of the outer arm 26 is a first wrist frame 30, which is rotatable about the rotary shaft 28. Supported through a rotary shaft 32 perpendicular to the rotary shaft 28 by the first wrist frame 30 is a second wrist frame 34, which can swivel about the rotary shaft 32. Further, supported through a rotary shaft 36 perpendicular to the rotary shaft 32 by the second wrist frame 34 is a third wrist frame 38, which is rotatable about the rotary shaft 36. Secured to this third wrist frame 38 is a mechanical hand 40, which can perform an operation of grasping an object, not shown.

The rotary frame 16, inner arm 22, outer arm 26, wrist frames 30, 34 and 38, which are successively, rotatably supported through the respective rotary shafts by the base 12 as described above, are adapted to individually rotate or swivel about the respective rotary shafts by means of servomotors incorporated therein, respectively. In consequence, the mechanical hand 40 has six degrees of freedom of motion, and is disposed at a desired position in a desired posture, so as to be able to transfer and work on the object.

Figure 2:
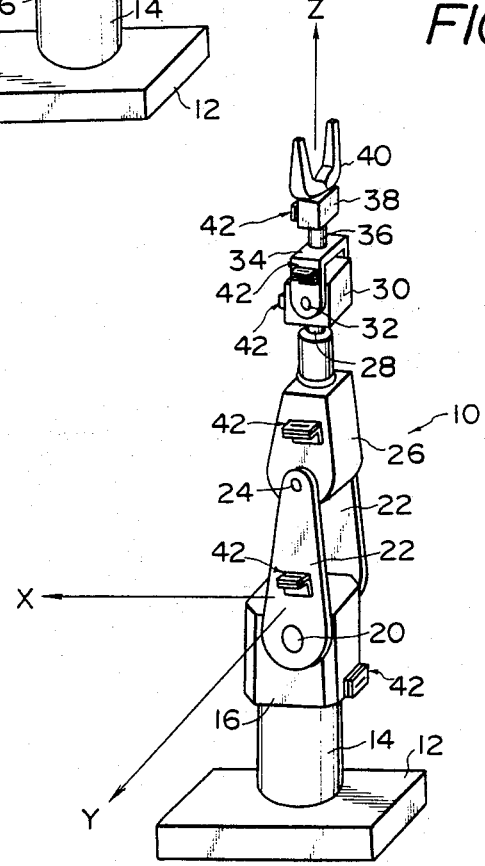
FIG. 2 is a perspective view showing the robot in FIG. 1 in a state of being at the origin.

This robot 10 is assembled in such a manner that a state thereof shown in FIG. 2 is a position of an origin. In this position of the origin, the rotary shafts 20, 24 and 32 are in parallel to one another and horizontal, the rotary shafts 18, 28 and 36 are coaxial of one another and vertical, a vertical line passing through the axes of the rotary shafts 18, 28 and 36 coaxial of one another is determined to be a Z axis, a horizontal line being in parallel to the horizontal rotary shaft 20 and having a predetermined height above the base 12 is determined to be a Y axis, and a horizontal line perpendicular to these Z and Y axes is determined to be an X axis. In consequence, in this robot 10, the respective moving sections (movable members or arm elements) are given positional data by a cartesian coordinate system, transferred by means of the servomotors, not shown, and the mechanical hand is transferred to an instructed position in an instructed posture, so as to work on the object.

Figure 3:
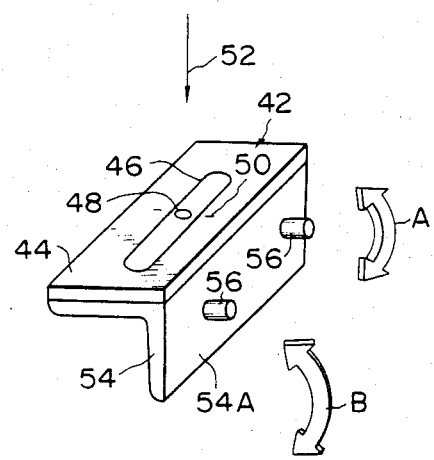
FIG. 3 is a perspective view showing the level and the L-shaped bracket.
Figure 4:
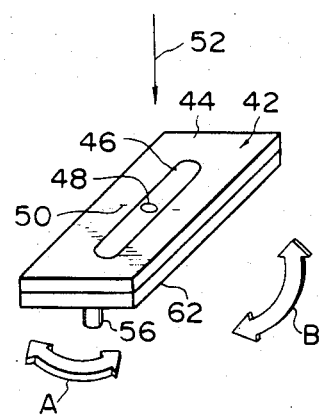
FIG. 4 is a perspective view showing the level and the flat plate mounting member.

Levels 42 are secured to the respective moving sections for measuring the origins. As shown in FIGS. 3 and 4, each of the levels 42 is a commonly used bubble level, in which an elongate glass vial is formed at the center of a flat plate 44 and this glass vial 46 is filled up with liquid with a bubble 48 remaining. A mark 50 is marked at a position corresponding to the center of the glass vial 46 in the longitudinal direction on the flat plate 44, and, when the flat plate is held horizontal, the bubble 48 is positioned at the center of the glass vial to be brought into register with the mark 50.

In consequence, with this level 42, a line of vision 52 is directed at a right angle to the flat plate 44 from above, so as to ascertain the positional relationship between the bubble 48 and the mark 50. If the longitudinally opposite ends of the glass vial 46 are disposed on an inclined surface, differing in height from each other, then the bubble 48 does not come into register with the mark 50, so that a non-horizontal plane can be detected.

Description will now be given of the position at which the level 42 is mounted to the inner arm 22.

A plane perpendicular to the flat plate 44 of the level 42 and extending in the longitudinal direction of the glass vial 46, i.e., a plane incorporating a line of vision 52 of the level 42 (the plane of vision) is deemed to be incorporated in a plane perpendicular to the hori-zontal rotary shaft 20, and, when the inner arm 22 is in a state of being at the origin, the longitudinal direction of the glass vial 46 is in parallel to the X axis (Refer to FIG. 2).

In the levels 42 of the outer arm 26 and the second wrist frame 34, the planes of vision incorporating the lines of vision of the level are disposed in planes perpendicular to the rotary shafts 24 and 32, respectively, in the same manner as in the case of the inner arm 22, and the longitudinal directions of the glass vials of the levels in states of being at the origins are in parallel to the X axis.

Furthermore, in the level 42 of the first wrist frame 30, the plane of vision incorporating the line of vision of the level 42 is disposed in a plane perpendicular to the rotary shaft 28, and the longitudinal direction of the glass vial in a state of being at the origin is in parallel to the Y axis. Similarly, in the level 42 of the third wrist frame 38, the plane of vision is disposed in a plane perpendicular to the rotary shaft 36, and the longitudinal direction of the glass vial in a state of being at the origin is in parallel to the Y axis.

Description will hereunder be given of means of mounting these levels 42 to the respective moving sections and means of positioning. To mount the levels 42 to the inner arm 22, the outer arm 26 and the second wrist frame 34, L-shaped brackets 54 shown in FIG. 3 are provided. The level 42 is mounted on one side piece of this L-shaped bracket 54, and a pair of round pins 56 project at right angles from the other side piece.

Figure 5:
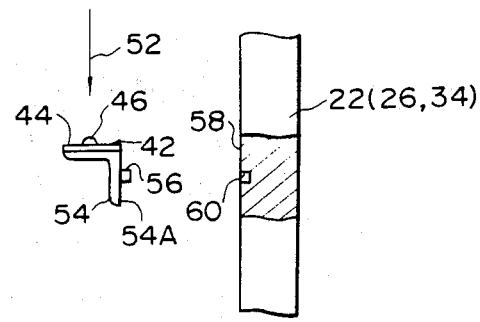
FIG. 5 is a partially sectional view showing the state where the level is removed from the moving section.

On the other hand, a pair of cylindrical holes 60 are penetratingly provided in a level mounting surface 58 of each of the inner arm 22, the outer arm 26 or the second wrist frame 34 and opposed to the round pins 56 as shown in FIG. 5. In consequence, when the round pins 56 of the L-shaped brackets 54 are inserted into the cylindrical holes 60, the levels 42 are reliably mounted to the respective moving sections, so that the origin measuring operation can be performed.

These cylindrical holes 60, closely receiving therein the round pins 56 of the L-shaped bracket 54, constitute positioning means, by which the positional relationship between the level 42 and the moving section in a plane perpendicular to the axes of the round pins 56 (a direction indicated by a double-headed arrow A in FIG. 3) is definitely determined and the positional relationship between the level 42 and the moving section in a plane perpendicular to a plane incorporating the axes of the pair of round pins 56 and in parallel to the axes of the round pins 56 (a direction indicated by a double-headed arrow B in FIG. 3) is definitely determined. With the above-described arrangement, the positional relationships of the levels 42 about the Y axis and the X axis with respect to the inner arm 22 as shown in FIG. 2 are definitely determined. In order to control the positional relationships of the levels 42 with the inner arm 22 in the direction indicated by the arrow B, i.e., about the X axis as shown in FIG. 2, the surfaces 54A for mounting the L-shaped brackets 54 should be closely attached to the surfaces 58 of the moving sections for mounting the levels 42. The surfaces 54A and 58 for mounting the levels 42 are preferably flat ones.

On the other hand, the levels 42 mounted to the first wrist frame 30 and the third wrist frame 38 are solidly secured to flat plate mounting members 62 as shown in FIG. 4, and a pair of round pins 56 project from each of the flat plate mounting members 62 in the same manner as from the aforesaid L-shaped bracket 54. These round pins 56 are inserted into a pair of round holes, not shown, penetratingly provided in the first wrist frame 30 and the third wrist frame 38 in the same manner as in the inner arm 22, so that the positional relationships of mounting the level 42 can be definitely determined in the same manner as above.

In addition, in each of the arm and the frames, there is incorporated a rotary encoder capable of detecting the angles of relative rotations.

Description will now be given of a method of measuring the origins of the moving sections in the robot 10 of the present embodiment.

The rotary frame 16, in which the axis of the rotary shaft 18 has been precisely vertically disposed, is used as a reference section, and the inner arm 22 is rotated relative to this rotary frame 16, so that the origin of the inner arm 22 can be measured. More specifically, after the horizontal rotary shaft 20 of the rotary frame 16 has been disposed in parallel to the Y axis, the inner arm 22 is rotated about this horizontal rotary shaft 20, the position of bubble 48 in the level 42 is read visually or by means of a reading device, and, if the inner arm 22 is stopped in rotation at the time this bubble 48 moves toward the center of the glass vial 46 and comes into register with the mark 50, then the inner arm 22 comes into a state of being at the origin as shown in FIG. 2, and the axis of the horizontal rotary shaft 24 is disposed at a position where the axis intersects the Z axis.

Furthermore, the origin of the outer arm 26 can be measured by the same means as above, utilizing the inner arm 22, which has been brought to the origin as described above, as a reference section.

The origin of the first wrist frame 30 is measured such that, once the outer arm 26 is rotated about the horizontal rotary shaft 24 and the axis of the rotary shaft 28 is disposed in parallel to the X axis, i.e., horizontally. Here, the first wrist frame 30 is rotated about the rotary shaft 28, and the position of the bubble in the level 42 solidly secured to the first wrist frame 30 is read, whereby the level 42 is brought into a horizontal position. Thereafter, when the outer frame 26 is restored to the position of the origin, the first wrist frame 30 is disposed at the position of the origin as shown in FIG. 2, so that the axis of the rotary shaft 32 can be disposed at a position where the axis intersects the Z axis.

The moving sections, in which the origins have been measured as described above, are successively utilized as being the reference sections, so that the origins can be successively measured from the moving section at the proximal end close to the rotary frame 16 to the rotary section at the distal end close to the mechanical hand 40.

In the foregoing, description has been given of the state where the origin of the rotary frame 16 has been measured. However, when the base 12 is utilized as the reference section in measuring the origin of the rotary frame 16, the level 42 is mounted to the rotary frame 16 in the same manner as in the case of the first wrist frame 30, and the vertical rotary shaft 18 is held in the horizontal position, so that the origin can be measured in the same manner as with the first wrist frame 30.

In the above embodiment, there have been shown the states where the levels are mounted to the respective moving sections. With these levels, the L-shaped brackets 54 or the flat plate mounting members 62 may be secured to the round holes as necessary, and, the levels may be removed depending on the using conditions of the robot.

However, with the above-described arrangement, when the levels 42 are reassembled to the respective moving sections, the round pins 56 are positioned and accurately mounted to the respective moving sections, and hence, the positional relationships between the levels 42 and the respective moving sections of the robot can remain unchanged.

Figure 6:
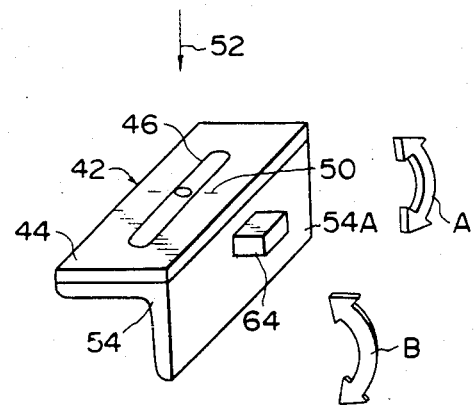
FIG. 6 is a perspective view showing the level and the L-shaped bracket in the second embodiment.

FIG. 6 shows another construciton for securing the level 42 to the moving section of the robot.

In this embodiment, projected from the L-shaped bracket 54 is a square column-shaped projection 64, which is adapted to be inserted into a rectangular hole formed in the moving section of the robot. In consequence, this L-shaped bracket 54 makes it possible to definitely secure the level to the moving section. The projection need not necessarily be square column-shaped, but, may be of any other non-circular shape.

In addition to the above embodiments, such an embodiment may be adopted that one of the round pins 56 shown in FIG. 3 is omitted, whereby the level 42 is made rotatable about the round pin as being a rotary shaft, so that the angle of rotation is made adjustable, thus enabling to make the positional relationship definite.

Further, a flat surface on the moving section in a robot may be utilized as means for mounting an angular sensor such as the level 42.

Having now fully described the invention, it will be apparent to one of ordinary skill in the art that many changes and modifications can be made thereto without departing from the spirit br scope of the invention as set forth herein.

What is claimed is:

1. A method of measuring the origin of movable arm elements with respect to a reference coordinate system of a robot having a robot arm including a base, a first movable arm element having a longitudinal axis and coupled to said base for rotation about an axis perpendicular to said longitudinal axis, and at least one second movable arm element coupled to said first movable arm element for rotation about an axis, said method comprising the steps of:

forming a mounting structure at a predetermined position on said movable arm element such that said mounting structure extends in a direction perpendicular to said longitudinal axis and is mounted to said first movable arm element in a plane perpendicular to the axis of rotation of said first movable arm element;

orienting said first movable arm element such that the axis of rotation of said first movable arm element extends horizontally and defines an origin with respect to said reference coordinate system;

mounting a sensor to said mounting structure for detecting an angle of inclination of said first movable arm element about said axis of rotation of said first movable arm element and with respect to said origin; and rotating said first movable arm element about said axis of rotation of said first movable arm element in response to a detected angle of inclination to position said first movable arm element at said origin.

2. The method of claim 1 wherein said mounting step includes forming said sensor as a level and orienting said level such that it has a viewing plane which is perpendicular to the axis of rotation of said first movable arm element.

3. The method of claim 2 further including the steps of forming said at least one second movable arm element as a plurality of movable arm elements each having a longitudinal axis and successively coupled to an adjacent movable arm element for rotation about an axis, orienting the axis of rotation of each of said plurality of movable arm elements such that they extend horizontally, forming a mounting structure at a predetermined position on each of said plurality of movable arm elements such that said mounting structure extends in a direction perpendicular to the longitudinal axis of the movable arm element and is mounted to the movable arm element in a plane perpendicular to its axis of rotation, mounting a sensor to said mounting structure of each of said plurality of movable arm elements for detecting an angle of inclination of said movable arm elements about each axis of rotation and with respect to said origin, forming each sensor as a level, orienting each level of said plurality of movable arm elements such that it has a viewing plane which is perpendicular to the axis of rotation of its associated movable arm element, and successively rotating each of said plurality of movable arm elements about its axis of rotation in response to an angle of inclination detected by its associated level to successsively position each of said movable arm elements at the origin.

4. The method of claim 2 further comprising detachably mounting said level to said first movable arm element.

5. The method of claim 2 further comprising forming said level as a flat plane having an elongate glass vial coupled to said flat plate and filled with a liquid and bubble to form a bubble level.

6. In an apparatus for measuring the origin of movable arm elements with respect to a reference coordinate system of a robot having a robot arm including a base, a first movable arm element having a longitudinal axis and coupled to said base for rotation about an axis perpendicular to said longitudinal axis, and at least one second movable arm element coupled to said first movable arm element for rotation about an axis, the improvement in said apparatus comprising:

means for forming a mounting structure at a predetermined position on said first movable arm element such that said mounting structure extends in a direction perpendicular to said longitudinal axis and is mounted to said first movable arm element in a plane perpendicular to the axis of rotation of said first movable arm element;

means for orienting said first movable arm element such that the axis of rotation of said first movable arm element extends horizontally and defines an origin with respect to said reference coordinate system;

sensor means coupled to said mounting structure for detecting an angle of inclination of said first movable arm element about said axis of rotation of said first movable arm element and with respect to said origin; and means for rotating said first movable arm element about said axis of rotation of said first movable arm element in response to a detected angle of inclination to position said first movable arm element at said origin.

7. The apparatus of claim 6 wherein said sensor means is a level having a viewing plane perpendicular to said axis of rotation of said first movable arm element.

8. The apparatus of claim 7 wherein said mounting structure is selected from a group consisting of an L-shaped bracket and a flat plate.

9. In an apparatus for measuring the origin of movable arm elements with respect to a reference coordinate system of a robot having a robot arm including a base, a first movable arm element having a longitudinal axis and coupled to said base for rotation about an axis perpendicular to said longitudinal axis, and at least one second movable arm element coupled to said first movable arm element for rotation about an axis, the improvement in said apparatus comprising:

means for forming a mounting structure at a predetermined position on said first movable arm element such that said mounting structure extends in a direction perpendicular to said longitudinal axis and is mounted to said first movable arm element in a plane perpendicular to the axis of rotation of said first movable arm element;

means for orienting said first movable arm element such that the axis of rotation of said first movable arm element extends horizontally and defines an origin with respect to said reference coordinate system;

sensor means mounted to said mounting structure for detecting an angle of inclination of said first movable arm element about said axis of rotation of said first movable arm element and with respect to said origin, said sensor means being formed as a level having a viewing plane perpendicular to said axis of rotation of said first movable arm element and said mounting structure is selected from a group consisting of an L-shaped bracket and a flat plate, means for positioning said mounting structure at said predetermined position on said first movable arm element; and means for rotating said first movable arm element about said axis of rotation of said first movable arm element in response to a detected angle of inclination to position said first movable arm element at said origin.

10. The apparatus of claim 9 wherein said means for positioning comprises at least one projection extending from one of said mounting structure and said first movable arm element and at least one hole formed in the other of said one of said mounting structure and said first movable arm element and having a configuration of said projection for receiving said projection.

11. The apparatus of claim 10 wherein said at least one projection is formed from a selected one of the group consisting of a round projection and a non-circular projection.

12. The apparatus of claim 11 wherein said mounting structure is an L-shaped bracket having first and second sides, said level is constructed as a flat plate having an elongate glass vial coupled thereto and filled with a liquid and a bubble to form a bubble level, said bubble level being mounted on the first side of said L-shaped bracket, and said means for positioning includes a plurality of round pins constructed to extend from the second side of said L-shaped bracket and a plurality of holes formed in said first movable arm element for receiving said round pins.

13. The apparatus of claim 11 wherein said mounting structure is a flat plate having first and second surfaces, said level is constructed as a flat plate having an elongate glass vial coupled thereto and filled with a liquid and a bubble to form a bubble level, said bubble level being mounted on the first surface of said flat plate forming said mounting structure, and said means for positioning comprising a plurality of round pins constructed to extend from the second surface of said flat plate forming said mounting structure and a plurality of holes formed in said first movable arm element for receiving said round pins.

14. The apparatus of claim 11 wherein said means for positioning comprises a rectangular column-shaped projection constructed to extend from said mounting structure and a hole formed in said first movable arm element having a rectangular configuration for receiving said column-shaped projection.

15. The apparatus of claim 6 wherein said mounting structure is a flat surface on said first movable arm element.

* * * * *